(12) United States Patent
Hou et al.

(10) Patent No.: US 10,656,055 B2
(45) Date of Patent: May 19, 2020

(54) CONVEYOR BELT SPECIFICATION DETERMINING METHOD

(71) Applicant: The Yokohama Rubber Co., LTD., Minato-ku, Tokyo (JP)

(72) Inventors: Gang Hou, Hiratsuka (JP); De Qing Zou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 387 days.

(21) Appl. No.: 15/568,790

(22) PCT Filed: Mar. 28, 2016

(86) PCT No.: PCT/JP2016/059956
§ 371 (c)(1),
(2) Date: Oct. 23, 2017

(87) PCT Pub. No.: WO2016/170929
PCT Pub. Date: Oct. 27, 2016

(65) Prior Publication Data
US 2018/0100785 A1   Apr. 12, 2018

(30) Foreign Application Priority Data

Apr. 23, 2015 (JP) .................................. 2015-088024
Sep. 24, 2015 (JP) .................................. 2015-186890

(51) Int. Cl.
*B65G 43/00* (2006.01)
*B65G 15/30* (2006.01)
(Continued)

(52) U.S. Cl.
CPC .......... *G01M 99/008* (2013.01); *B65G 15/30* (2013.01); *B65G 15/32* (2013.01); *B29D 29/06* (2013.01);
(Continued)

(58) Field of Classification Search
None
See application file for complete search history.

(56) References Cited

U.S. PATENT DOCUMENTS 7,494,004 B2 * 2/2009 Stolyar .................. B65G 43/02
                                                     198/810.02
7,673,739 B2 * 3/2010 Freeman ................ B65G 43/02
                                                     198/810.01
(Continued)

FOREIGN PATENT DOCUMENTS

JP    S60-177042      9/1985
JP    2001-026670     1/2001
(Continued)

OTHER PUBLICATIONS

CES EduPack User Manual and Getting Started Guide, Apr. 2014, Granata Material Inspiration, 37 pages.
(Continued)

*Primary Examiner* — Kavel Singh
(74) *Attorney, Agent, or Firm* — Thorpe North & Western

(57) ABSTRACT

Provided is a conveyor belt specification determination method. Severity of a use condition of a conveyor belt is categorized into categories. A database in which a permissible range of prescribed characteristics of an upper cover rubber, including wear resistance and cut resistance, for each of the categories is set is created; a degree of influence of representative rubber physical properties, which affect the prescribed characteristics, of the upper cover rubber on the prescribed characteristics is ascertained; a category is identified from the use conditions of the conveyor belt on the basis of the database; an appropriate range of the representative rubber physical property is identified for which the prescribed characteristics are in the permissible range in the identified category; and a rubber type for which the rubber physical properties are in this appropriate range is selected as the upper cover rubber.

12 Claims, 10 Drawing Sheets

(51) Int. Cl.
*B65G 15/32* (2006.01)
*G01M 99/00* (2011.01)
*B29D 29/06* (2006.01)
*B65G 15/40* (2006.01)

(52) U.S. Cl.
CPC .... *B65G 15/40* (2013.01); *B65G 2812/02168* (2013.01); *B65G 2812/02207* (2013.01)

(56) References Cited

U.S. PATENT DOCUMENTS

| | | | |
|---|---|---|---|
| 7,779,994 B1* | 8/2010 | Travis | B65G 43/02 198/810.01 |
| 9,850,069 B2* | 12/2017 | Sasakuma | B65G 15/32 |
| 10,221,019 B2* | 3/2019 | Hou | B65G 43/02 |
| 10,377,575 B2* | 8/2019 | Hou | G01N 3/56 |
| 10,450,140 B2* | 10/2019 | Hazim | F16G 1/04 |

FOREIGN PATENT DOCUMENTS

| | | |
|---|---|---|
| JP | 2001-088922 | 4/2001 |
| JP | 2009-035373 | 2/2009 |
| JP | 2014-040295 | 3/2014 |
| WO | WO 2009/016830 | 2/2009 |

OTHER PUBLICATIONS

Getting Started Guide, Granata Material Intelligence, 2012, 33 pages.
International Search Research for International Application No. PCT/JP2016/059956 dated Jun. 28, 2016, 2 pages, Japan.

\* cited by examiner

CONVEYOR BELT SPECIFICATION DETERMINING METHOD

TECHNICAL FIELD

The present technology relates to a conveyor belt specification determination method and particularly relates to a conveyor belt specification determination method capable of efficiently determining a specification of an upper cover rubber having durability matching use conditions.

BACKGROUND ART

Various objects, including mineral resources such as iron ore and limestone, are conveyed by a conveyor belt.

When being conveyed by the conveyor belt, the objects to be conveyed are fed onto an upper cover rubber of the conveyor belt from a hopper or another conveyor belt.

The fed objects to be conveyed are loaded on the upper cover rubber and conveyed in a traveling direction of the conveyor belt.

When the objects to be conveyed are fed onto the upper cover rubber of the conveyor belt, the upper cover rubber is subject to impact, and when the surfaces of the objects to be conveyed are sharp, the upper cover rubber sometimes sustains cut damage.

When the objects to be conveyed are loaded on the upper cover rubber and conveyed, the upper cover rubber is subject to wear as a result of the objects to be conveyed sliding on the upper cover rubber.

Thus, in known art, various proposals have been made (see Japanese Unexamined Patent Application Publication Nos. 2001-88922A and 2014-40295A for example) in order to improve the cut resistance of the upper cover rubber, or to improve the wear resistance of the upper cover rubber.

A size and occurrence frequency of the cut damage, a wear amount, and the like occurring in the upper cover rubber significantly change depending on use conditions of the conveyor belt (including types of the objects to be conveyed).

Additionally, even under the same use conditions, degrees of damage vary depending on the rubber physical properties of the upper cover rubber.

Thus, when determining a specification of the conveyor belt (a specification of the upper cover rubber, for example), it has been necessary to determine the specification in each individual case, namely to determine a specific specification, on the basis of the use conditions, which has been a problem in that it requires a great number of man-hours.

SUMMARY

The present technology provides a conveyor belt specification determination method capable of efficiently determining a specification of an upper cover rubber having durability matching use conditions.

A conveyor belt specification determination method of the present technology to achieve the object described above includes the steps of:

categorizing, into a plurality of categories, a severity of use conditions of a conveyor belt, using a horizontal energy and a vertical energy as indices, the horizontal energy and vertical energy being received by the conveyor belt as a result of objects to be conveyed being fed onto and loaded on an upper cover rubber of the conveyor belt and conveyed;

creating a database in which a permissible range of each of prescribed characteristics is set for each of the categories, the prescribed characteristics including at least wear resistance and cut resistance of the upper cover rubber;

setting a representative rubber physical property of the upper cover rubber that affects each of the prescribed characteristics;

ascertaining a degree of influence of the representative rubber physical property that is set on the prescribed characteristics;

when determining a specification of the conveyor belt, identifying the category of severity from the use conditions of the conveyor belt on the basis of the database;

identifying an appropriate range of the representative rubber physical property for which the prescribed characteristics are in the permissible range in the category that is identified; and selecting a rubber type, for which the representative rubber physical property is in the appropriate range that is identified, as the upper cover rubber.

The horizontal energy that is received by the conveyor belt when the objects to be conveyed are fed onto and conveyed while being loaded on the conveyor belt mainly has a large impact on a wear amount of the upper cover rubber. The vertical energy mainly has a large impact on the size and occurrence frequency of cut damage of the upper cover rubber.

Thus, by providing a database in which the severity of the use conditions of the conveyor belt is categorized into the plurality of categories while using the horizontal energy and vertical energy as indices, use conditions are easily sorted in an appropriate manner.

Additionally, each of the categories of severity includes a permissible range for the wear resistance, the cut resistance, and other prescribed characteristics of the upper cover rubber in order to enhance durability.

By setting the representative rubber physical properties of the upper cover rubber that affect these prescribed characteristics, and ascertaining the degree of influence of the set representative rubber physical properties on the prescribed characteristics, a rubber type of the upper cover rubber, for which the prescribed characteristics are in the permissible ranges, can be effectively determined from the use conditions of that conveyor belt.

Here, the severity of the use conditions of the conveyor belt is categorized into at least five categories, for example.

By categorizing the severity into the at least five categories, most of the actual use conditions of the conveyor belt can be covered.

Loss factor and rubber hardness, for example, are included in the representative rubber physical properties.

The loss factor and the rubber hardness significantly affect the degree of damage of the upper cover rubber and, as such, by taking these rubber physical properties into consideration, a specification of an upper cover rubber with superior durability that matches the use conditions in a better manner can be determined.

A configuration is possible in which an ambient temperature of a location where the conveyor belt is used is included in the use conditions, a plurality of ambient temperatures differing from each other are set, and the database is created for each of the ambient temperatures.

Of the use conditions of the conveyor belt, the ambient temperature most significantly affects the durability (life) of the conveyor belt.

As such, by including the ambient temperature in the use conditions, a more appropriate specification of the upper cover rubber that matches the actual use conditions can be determined.

For example, a predetermined temperature of −20° C. or lower, a predetermined temperature of 80° C. or higher, and a predetermined temperature from 0° C. to 40° C. are included in the ambient temperatures, and at least these three ambient temperatures are set.

As a result, most of the ambient temperatures at locations where conveyor belts are used can be covered.

Furthermore, a configuration is possible in which the conveyor belt specification determination method includes:

using a sample for each type of rubber, performing rubber wear resistance testing in which apparent compressive stress caused by pressure applied to the sample is varied;

acquiring a relationship between the apparent compressive stress and a surface roughness of the sample obtained from the testing;

acquiring a relationship between the surface roughness and a wear amount per unit friction energy of the sample obtained from the testing;

creating a database on the basis of the acquired relationships, the database showing a correlation between the surface roughness, the apparent compressive stress, and the wear amount per unit friction energy; and when determining a specification of the conveyor belt, selecting a rubber type, for which the wear amount per unit friction energy of the sample is in a preset permissible range, as the upper cover rubber, on the basis of the apparent compressive stress caused by the pressure applied to the upper cover rubber by conveyed articles and the database showing the correlation.

Alternatively, a configuration is possible in which the conveyor belt specification determination method includes:

using samples of a plurality of rubber types having different viscoelastic characteristics, performing rubber wear resistance testing corresponding to the use conditions of each of the categories;

acquiring a relationship between an average wear pitch calculated from a surface roughness of each of the samples obtained from the testing and the viscoelastic characteristics of the rubber type of the sample;

acquiring a relationship between the average wear pitch and an actual wear amount of the sample obtained from the testing;

creating a database on the basis of the acquired relationships, the database showing a correlation between the average wear pitch, the viscoelastic characteristics, and the actual wear amount of the sample; and when determining a specification of the conveyor belt, selecting a rubber type, for which the actual wear amount of the sample is in a preset permissible range, as the upper cover rubber, on the basis of the viscoelastic characteristics of the rubber type and the database showing the correlation.

DETAILED DESCRIPTION

Figure 1:
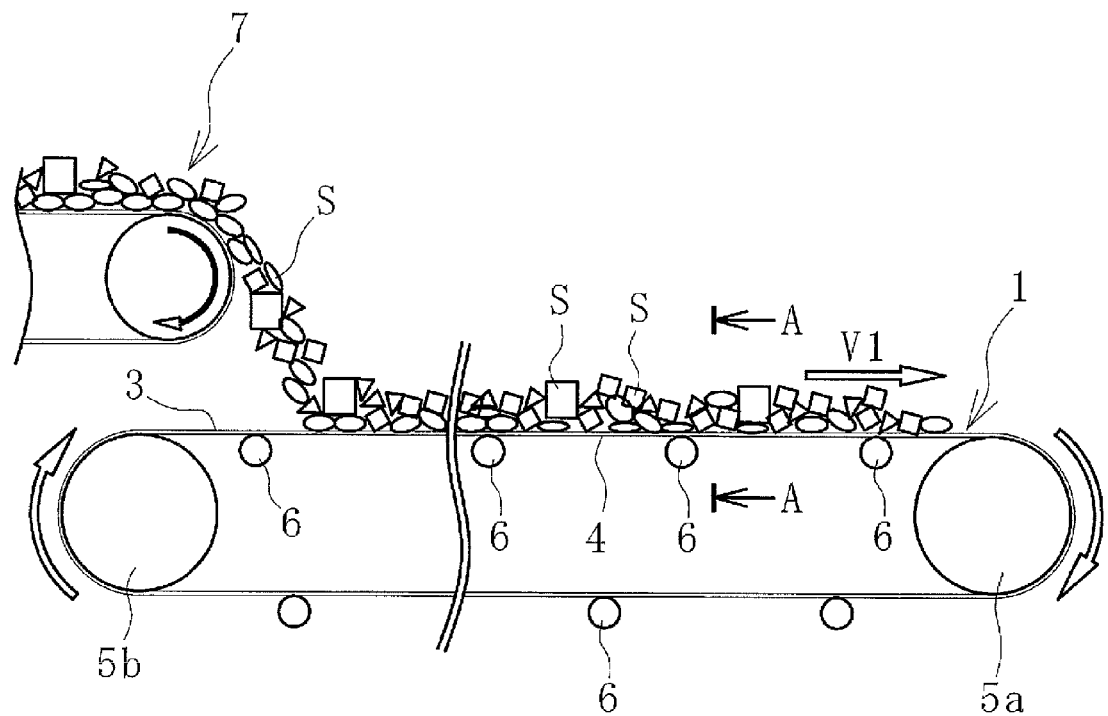
FIG. 1 is an explanatory diagram illustrating a conveyor belt line in a simplified manner.

A conveyor belt specification determination method of the present technology will be described below on the basis of an embodiment illustrated in the drawings.

In a conveyor belt line illustrated in FIG. 1, objects to be conveyed S conveyed by another conveyor belt 7 are fed onto a conveyor belt 1 and conveyed to a conveying destination by this conveyor belt 1.

The objects to be conveyed S may be fed onto the conveyor belt 1 by a hopper and the like.

The conveyor belt 1 is stretched at a prescribed tension between pulleys 5a and 5b.

Figure 2:
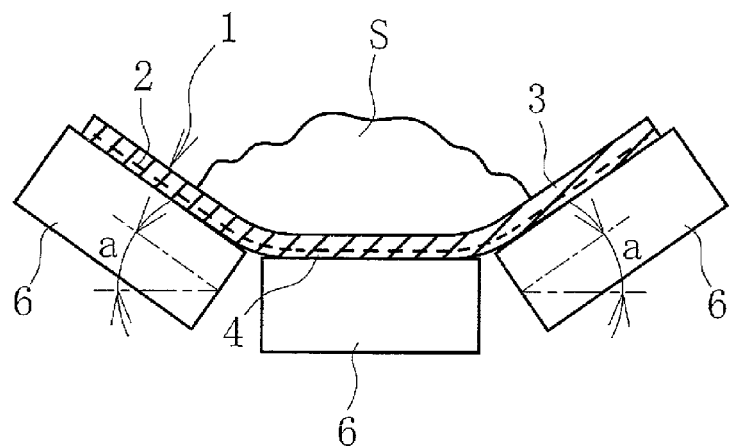
FIG. 2 is a cross-sectional view taken along A-A of FIG. 1.

As illustrated in FIG. 2, the conveyor belt 1 is configured by a core layer 2 formed of a core, such as canvas or steel cords, and an upper cover rubber 3 and a lower cover rubber 4 that sandwich the core layer 2 therebetween.

The core layer 2 is a member bearing the tension that causes the conveyor belt 1 to be stretched.

The lower cover rubber 4 is supported by support rollers 6 on a carrier side of the conveyor belt 1, and the upper cover rubber 3 is supported in a flat manner by support rollers 6 on a return side of the conveyor belt 1.

Three of the support rollers 6 are arranged on the carrier side of the conveyor belt 1 in the belt width direction. The conveyor belt 1 is supported by these support rollers 6 in a concave shape having a prescribed trough angle a.

When the pulley 5a on a drive side is rotationally driven, the conveyor belt 1 is operated in one direction at a prescribed traveling speed V1.

The objects to be conveyed S are fed onto the upper cover rubber 3, and are loaded on the upper cover rubber 3 and conveyed.

Figure 3:
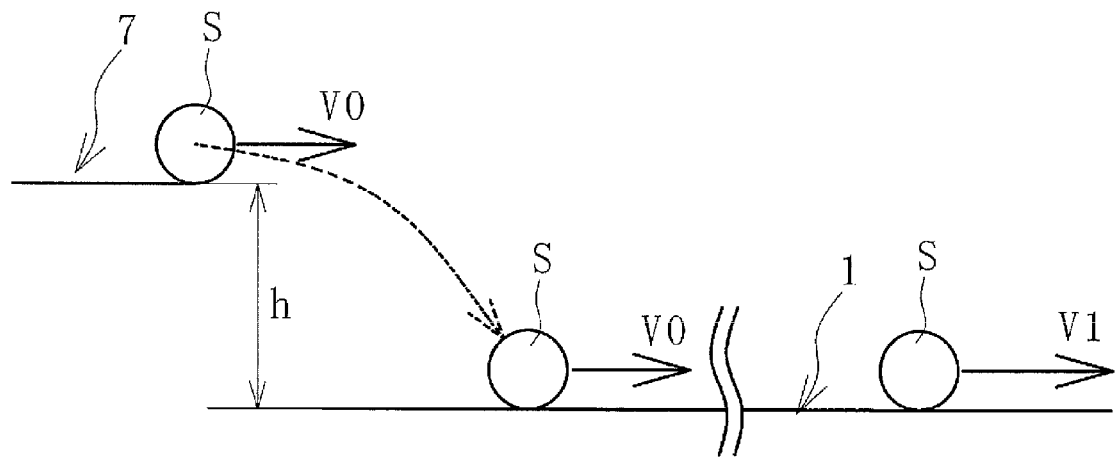
FIG. 3 is an explanatory diagram illustrating a state of horizontal energy and vertical energy received by the conveyor belt.

In this conveyor belt line, as illustrated in FIG. 3, the conveyor belt 1 and the other conveyor belt 7 are arranged so as to have a vertical difference h therebetween (the difference h between height positions of respective conveying surfaces of the conveyor belts 1 and 7).

On the other conveyor belt 7, the objects to be conveyed S are conveyed at a horizontal direction speed V0, while a vertical direction speed is zero.

At the moment at which the objects to be conveyed S are fed toward the conveyor belt 1 from the other conveyor belt 7, the objects to be conveyed S with the mass m have the kinetic energy of $(m*V0^2)/2$.

Furthermore, when the position of the conveying surface of the conveyor belt 1 at this point in time is used as a reference, the potential energy of the objects to be conveyed S with the mass m is mgh, where g is the gravitational acceleration.

Thus, an energy E0 of the objects to be conveyed S with the mass m at this point in time is expressed by the following Equation (1).

$$E0=(m*V0^2)/2+mgh \qquad (1)$$

When the objects to be conveyed S are loaded on the conveyor belt 1, the horizontal direction speed remains at V0, and the vertical direction speed becomes zero.

Then, the objects to be conveyed S are loaded on and conveyed by the conveyor belt 1. The objects to be conveyed S are conveyed in the horizontal direction at the traveling speed V1 of the conveyor belt 1.

The traveling speed V1 is faster than the horizontal direction speed V0 (V1>V0).

At a timing at which a state is obtained in which the objects to be conveyed S having the mass m are conveyed at the traveling speed V1, the energy of the objects to be conveyed S is a kinetic energy of $(m*V1^2)/2$, and there is no change in the potential energy thereof.

Thus, at the time the state is obtained in which the objects to be conveyed S having the mass m are conveyed at the traveling speed V1, an energy E1 of the objects to be conveyed S is expressed by the following Equation (2).

$$E1=(m*V1^2)/2 \qquad (2)$$

Thus, of an energy E received by the conveyor belt 1 as a result of the objects to be conveyed S with the mass m being fed onto the upper cover rubber 3 of the conveyor belt 1 and being loaded and conveyed, a horizontal energy Eh (a horizontal component) is expressed by the following Equation (3).

Further, of the energy E, a vertical energy Ev (a vertical component) is expressed by the following Equation (4).

$$Eh=(m*V1^2)/2-(m*V0^2)/2 \qquad (3)$$

$$Ev=mgh \qquad (4)$$

When Eh and Ev are respectively converted into a horizontal energy EH and a vertical energy EV received by a unit area of the conveyor belt 1 during an operation time, EH and EV are expressed by the following Equations (5) and (6).

$$EH=M*(V1^2-V0^2)*t/2/(W*L)/1000 \qquad (5)$$

$$EV=Mgh*t/(W*L)/1000 \qquad (6)$$

Here, M is the conveying weight per unit time (kg/h), g is the gravitational acceleration (9.8 m/s$^2$), V1 is the belt traveling speed (m/s), V0 is the initial horizontal direction speed of the objects to be conveyed (m/s), W is the effective width of the belt (m), L is the belt length (m), and t is the belt operation time (h).

Note that the effective width W of the belt is from 60% to 80% of the width dimension of the conveyor belt 1, for example, and is empirically set as the range over which the objects to be conveyed S are loaded.

Figure 4:
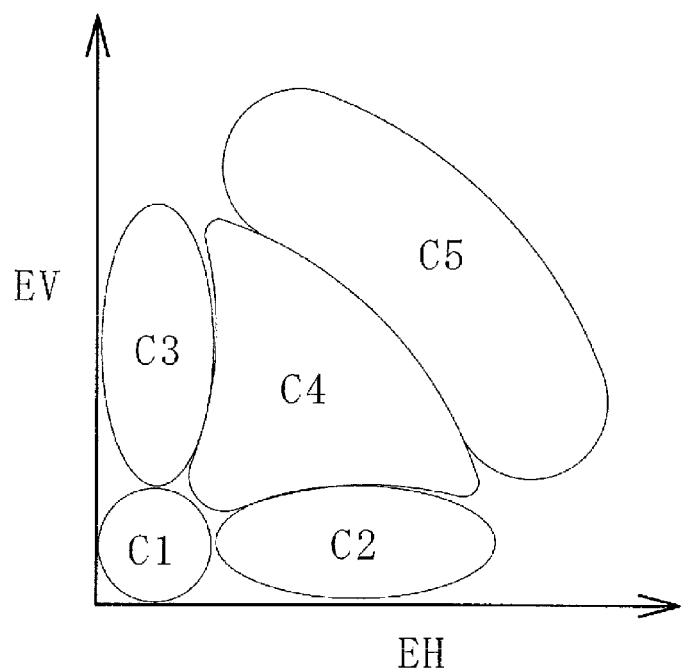
FIG. 4 is an explanatory diagram illustrating categorized categories.

As illustrated in FIG. 4, in the present technology, while using the horizontal energy EH and the vertical energy EV as indices, the severity of use conditions of the conveyor belt 1 is categorized into a plurality of categories C1 to C5.

In FIG. 4, the horizontal energy EH is the horizontal axis and the vertical energy EV is the vertical axis, while the severity is categorized into the five categories C1 to C5.

The first category C1 is a category in which the horizontal energy EH and the vertical energy EV are relatively small-scale.

The second category C2 is a category in which the horizontal energy EH is relatively medium-scale and the vertical energy EV is relatively small-scale.

The third category C3 is a category in which the horizontal energy EH is relatively small-scale and the vertical energy EV is relatively medium-scale.

The fourth category C4 is a category in which the horizontal energy EH and the vertical energy EV are relatively medium-scale.

The fifth category C5 is a category in which the horizontal energy EH and the vertical energy EV are relatively large-scale.

The number of categories is not limited to five, and may be three or four categories, or may be six or more categories.

However, when the number of categories becomes excessively large, data analysis and the like become complex. Thus, the number of categories preferably has an upper limit of around ten.

By categorizing the severity into the at least five categories, most of the actual use conditions of the conveyor belt 1 can be covered.

As described above, by acquiring data of prescribed characteristics, including wear resistance and cut resistance, with respect to the conveyor belt 1 adopting various use conditions and specifications of the upper cover rubber 3, an appropriate permissible range in actual use is ascertained for each of the characteristics.

Figure 5:
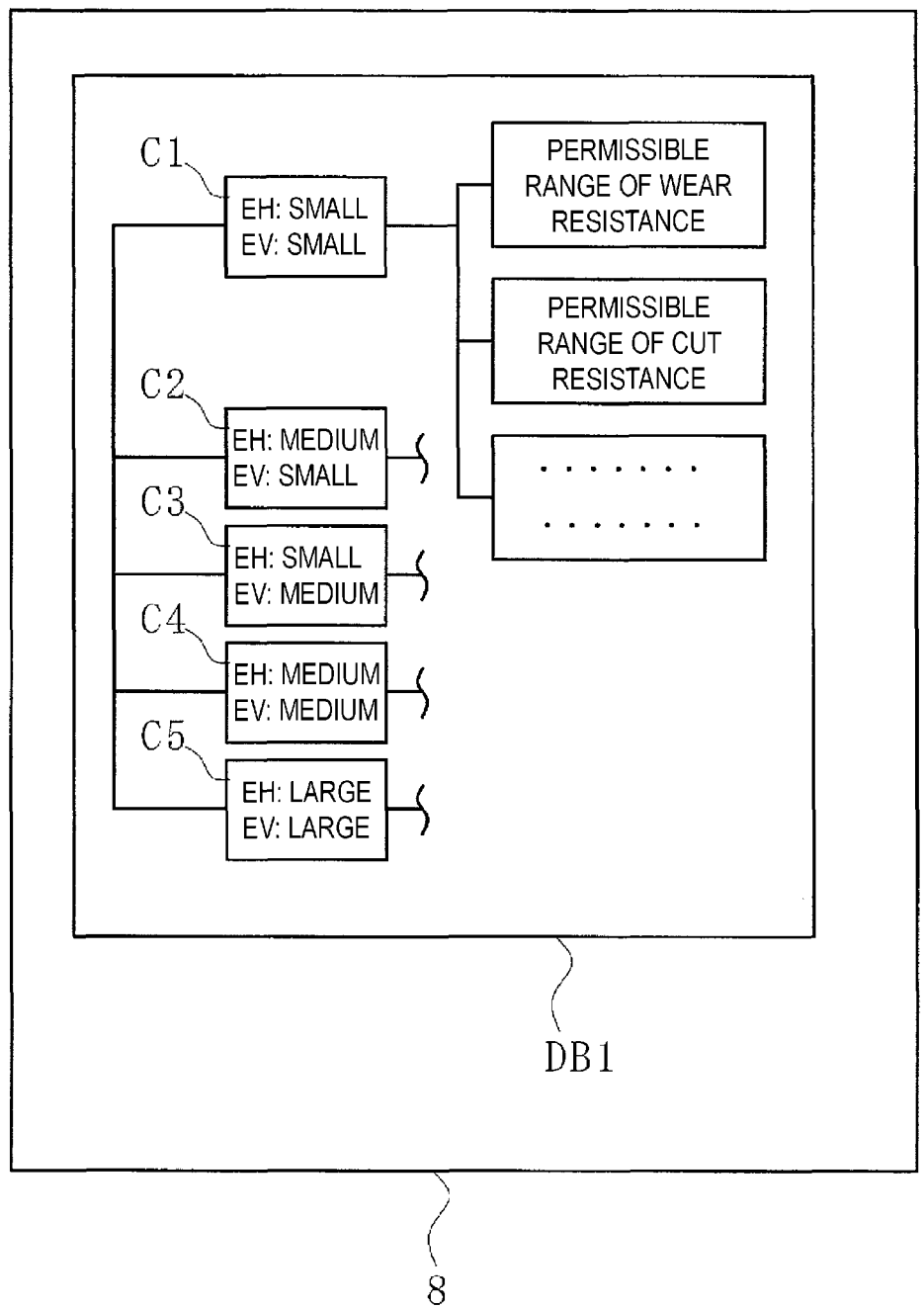
FIG. 5 is an explanatory diagram illustrating a structure of a database.

Next, as illustrated in FIG. 5, a database DB1 is created in advance in which permissible ranges are set for the prescribed characteristics of the upper cover rubber 3, including at least the wear resistance and the cut resistance, for each of the categories C1 to C5.

The database DB1 is input into and stored in a computation device 8, such as a personal computer.

For example, a test method is specified for the wear resistance, and an appropriate permissible range in terms of practical use is set for those categories.

Specific examples of the test method include a DIN abrasion test, a Lambourn abrasion test, a Pico abrasion test, an Akron abrasion test, and the like.

Permissible ranges of a wear amount identified using this type of specific wear test are set.

A test method is also specified for the cut resistance in the same manner, and an appropriate permissible range in terms of practical use is set for those categories.

Specific examples of the test method include a test method in which a blade of a prescribed specification (shape and weight) is dropped from a prescribed height, and the like.

Permissible ranges of a cut depth identified using this type of cut resistance test are set.

As the prescribed characteristics of the upper cover rubber, necessary characteristics may be incorporated as appropriate, in addition to the wear resistance and the cut resistance.

For example, chipping resistance may be incorporated. A test method is also specified for the chipping resistance in the same manner, and an appropriate permissible range in terms of practical use is set for each of the categories.

Furthermore, in the present technology, representative rubber physical properties of the upper cover rubber 3 that affect each of the wear resistance, the cut resistance, and similar prescribed characteristics are set.

Examples of the representative rubber physical properties includes loss factor (tan δ), rubber hardness, 100% modulus (tensile stress at 100% elongation), strength at break, elongation at break, and the like.

The representative rubber physical properties are not limited thereto and any properties that significantly affect the prescribed characteristics may be used as desired, depending on each the prescribed characteristics of the upper cover rubber 3.

Here, "loss factor" is defined as a ratio (G"/G') of a loss shear modulus G" to a storage shear modulus G', and indicates the amount of energy that is absorbed (that coverts to heat) when the upper cover rubber 3 deforms.

When the loss factor value is larger, more energy is absorbed, modulus of repulsion elasticity in shock absorbing tests is smaller, and resonance magnification in vibration tests is lower.

Figure 6:
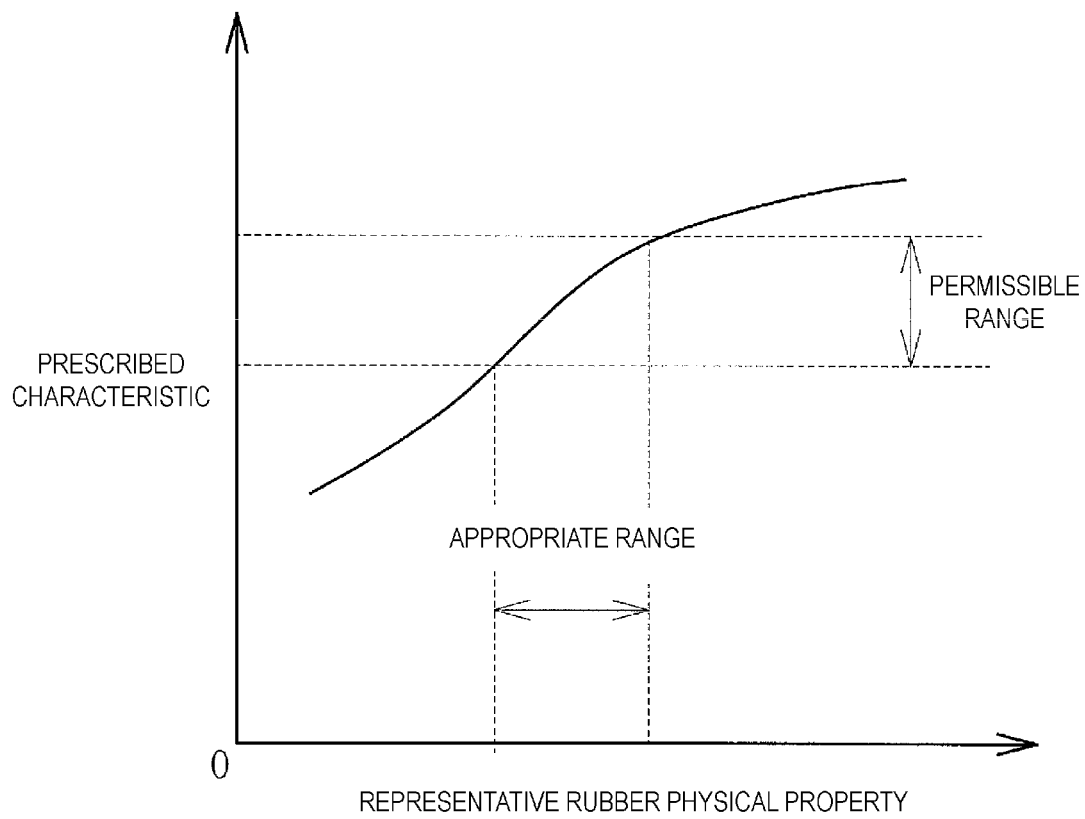
FIG. 6 is an explanatory diagram illustrating a relationship between a prescribed characteristic of the upper cover rubber and a representative rubber physical property.

The degree of influence of the set representative rubber physical properties on the prescribed characteristics is ascertained as illustrated by the solid line in FIG. 6.

For example, the effects of the loss factor, the rubber hardness, the 100% modulus, the strength at break, the elongation at break, and the like on the wear resistance, the cut resistance, the chipping resistance, and the like of the upper cover rubber 3 are ascertained.

Specifically, information such as "if the loss factor of the upper cover rubber 3 is in a range of so-and-so, the wear resistance will be in a range of so-and-so with respect to the permissible range", "when the loss factor is changed so-and-so amount, the wear resistance is changed so-and-so amount", and the like is ascertained from a variety of experiments and experience.

When determining a new specification of the conveyor belt 1, the horizontal energy EH and the vertical energy EV are calculated from the use conditions of the conveyor belt 1.

Next, on the basis of the calculated horizontal energy EH and vertical energy EV, and the database DB1 created in advance, the category of the severity of the use conditions of that conveyor belt 1 is identified.

Specifically, the calculated horizontal energy EH and the vertical energy EV are input into the computation device 8, and from the input calculated results, it is determined which of the categories stored in the database DB1 applies to the use conditions of the conveyor belt 1, and the category that matches the most is identified.

By identifying the category, the permissible ranges of the wear resistance, the cut resistance, and similar prescribed characteristics of the upper cover rubber 3 in that category become clear.

For each of the prescribed characteristics, representative rubber physical properties of the upper cover rubber 3 that affect that characteristic are set.

Here, appropriate ranges of the representative rubber physical properties are identified where the prescribed characteristics are in permissible ranges in the identified category.

At this time, the degree of influence (correlation) of the representative rubber physical properties on each of the prescribed characteristics is ascertained in advance by experiments and the like.

Accordingly, appropriate ranges of the representative rubber physical properties are identified on the basis of this information that was ascertained in advance.

Next, a rubber, for which the representative rubber physical properties are in these identified appropriate ranges, is selected from a plurality of rubber types and used as the upper cover rubber 3.

Additionally, thickness and the like of the upper cover rubber 3 is determined on the basis of the required service life and the like of the conveyor belt 1.

Thus, the specification of the upper cover rubber 3 is determined.

According to the present technology, the horizontal energy EH and the vertical energy EV received by the conveyor belt 1 when the objects to be conveyed S are fed, loaded and conveyed are set as indices to categorize the severity of use conditions of the conveyor belt 1 into the plurality of categories C1 to C5.

The horizontal energy EH mainly has a significant influence on the wear amount of the upper cover rubber 3, and the vertical energy EV mainly has a significant influence on the size and occurrence frequency of the cut damage of the upper cover rubber 3. Thus, use conditions are easily sorted in an appropriate manner.

Additionally, each of the categories of severity includes a permissible range for the wear resistance, the cut resistance, and other prescribed characteristics of the upper cover rubber 3 in order to enhance durability.

By setting the representative rubber physical properties of the upper cover rubber 3 that affect these prescribed characteristics, and ascertaining the degree of influence of the set representative rubber physical properties on the prescribed characteristics, a rubber type of the upper cover rubber 3, for which the prescribed characteristics are in the permissible ranges, can be effectively determined from the use conditions of the conveyor belt 1.

That is, a specification of an upper cover rubber 3 provided with appropriate durability fit for the use conditions thereof can be effectively determined without expending a great amount of effort.

The loss factor and the rubber hardness of the upper cover rubber 3 significantly affect the degree of damage of the upper cover rubber 3.

As such, considering these as the representative rubber physical properties is beneficial in determining a specification of the upper cover rubber 3 that has superior durability that matches the use conditions in a better manner.

Depending on the type of the objects to be conveyed S, for example, on whether it is iron ore, limestone, gravel, or the like, the hardness, sharpness, and the like of the objects differ. Thus, differences arise in a degree of damage and a degree of wear imparted to the upper cover rubber 3.

Thus, if the database DB1 is created in advance for each type of the objects to be conveyed S, the specification of the upper cover rubber 3 provided with the durability more closely matching the use conditions of the conveyor belt 1 can be determined.

Of the use conditions of the conveyor belt 1, an ambient temperature T at the installation location of the conveyor belt 1 most significantly affects the durability (life) of the conveyor belt 1.

For example, when the conveyor belt 1 is used under the hot sun, the ambient temperature T may be near 100° C.

On the other hand, when the conveyor belt 1 is used in a cold region, the ambient temperature T may be −20° C. or lower.

Rubber physical properties are often highly dependent on the ambient temperature T. For example, as the ambient temperature T rises, the rubber hardness, 100% modulus, strength at break, and the like typically decline, and the elongation at break typically increases.

Therefore, from the perspective of the durability of the conveyor belt 1, the ambient temperature T can be said to be the most important factor among the use conditions of the conveyor belt 1.

As such, it is preferable that the ambient temperature T be included in the use conditions of the conveyor belt 1, a plurality of ambient temperatures T differing from each other be set, and the database DB1 described above be created for each of the ambient temperatures T.

Figure 7:
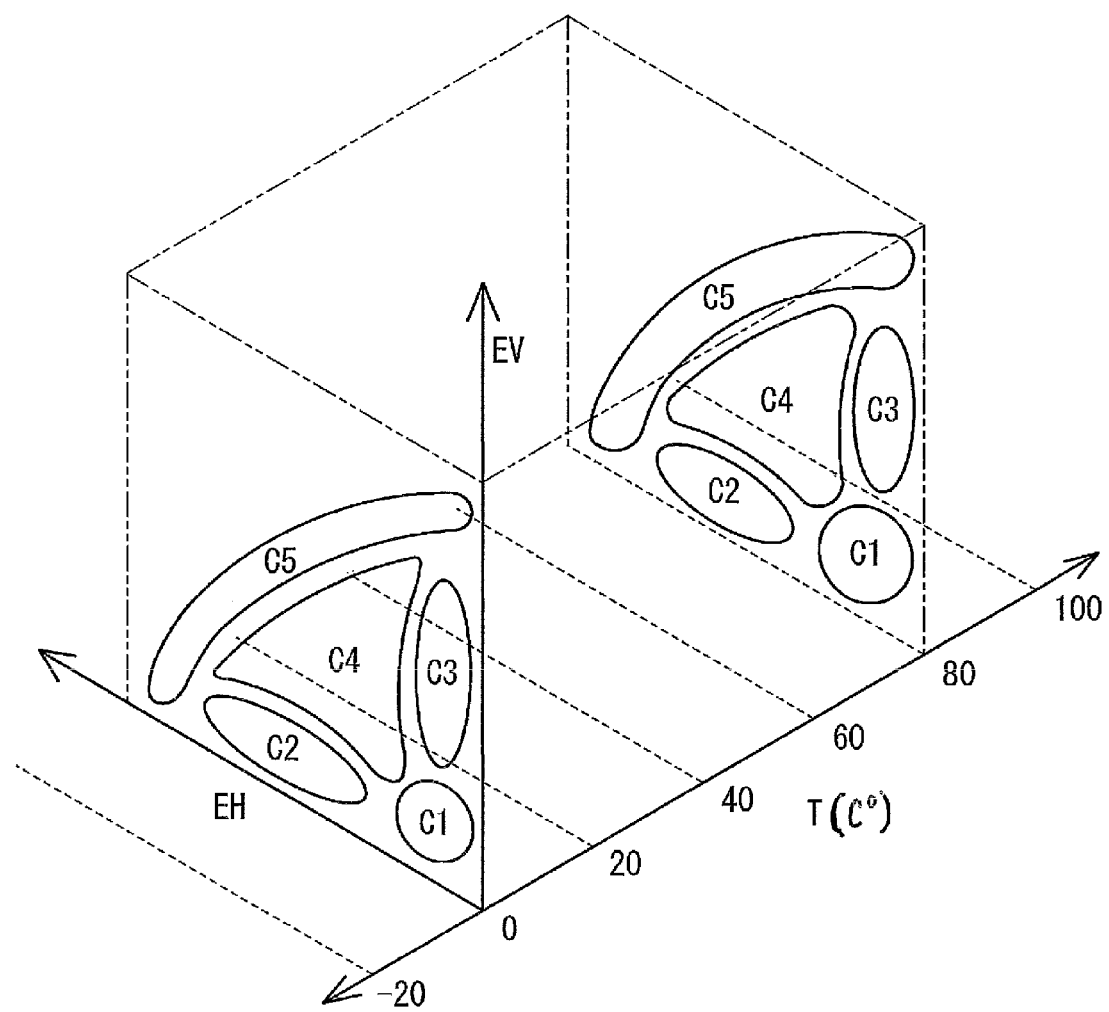
FIG. 7 is an explanatory diagram illustrating categories for each set ambient temperature.

That is, as illustrated in FIG. 7, the severity is classified into a plurality of categories C1 to C5 by ambient temperature T.

For example, the severity is classified into the plurality of categories C1 to C5 and the database DB1 described above is created for each of cases where the ambient temperature T is −20° C., 0° C., 20° C., 40° C., 60° C., and 80° C.

In FIG. 4, the horizontal energy EH and the vertical energy EV are used as indices, and the severity is two-dimensionally classified in the categories by setting the ambient temperature T to a single specific predetermined temperature.

On the other hand, in FIG. 7, the severity is three-dimensionally classified in the categories by setting a plurality of ambient temperatures T, and classifying the severity into the categories for each of the ambient temperatures T.

Thus, by including the ambient temperature T in the use conditions of the conveyor belt 1, a more appropriate specification of the upper cover rubber 3 that matches the actual use conditions can be determined.

Here, to cover most of the ambient temperatures T at locations where the conveyor belt 1 is used, it is preferable that at least three ambient temperatures T including a predetermined temperature of −20° C. or lower, a predetermined temperature of 80° C. or higher, and a predetermined temperature from 0° C. to 40° C. are used as the ambient temperatures T to be set.

It is more preferable that at least five ambient temperatures T including the predetermined temperature of −20° C. or lower, the predetermined temperature of 80° C. or higher, and the three predetermined temperatures from 0° C. to 60° C. are used as the ambient temperatures T to be set.

Note that, as in FIG. 4, when setting only one ambient temperature T and not setting a plurality of ambient temperatures T, one predetermined temperature in a range from 20° C. to 40° C., for example, is set as the ambient temperature T and the database DB1 described above is created.

An appropriate specification of the upper cover rubber 3 matching actual use conditions can be determined using, in addition to the database DB1, another database DB2 that has been input into and stored in the computation device 8.

To create this database DB2, known wear resistance testing is performed using samples B of rubber, and data is acquired.

Pico wear tests, DIN abrasion tests, Lambourn abrasion tests, Taber abrasion tests, Williams abrasion tests, Akron abrasion tests, and the like can be used for the known wear resistance testing.

Figure 8:
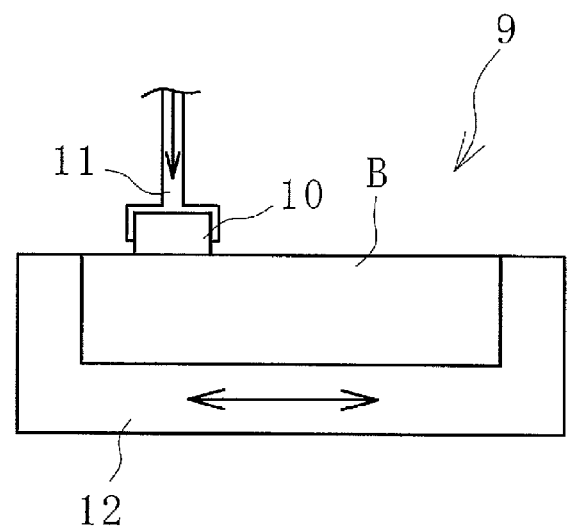
FIG. 8 is an explanatory diagram illustrating a basic structure of a wear testing device.

As illustrated in FIG. 8, a rubber wear testing device 9 typically includes a pressing body 10, a pressing mechanism 11 that presses the pressing body 10 against the sample B of the rubber, and a relative movement mechanism 12 that moves the pressing body 10 and the sample B relative to each other.

In a wear resistance testing method using this testing device 9, wear is caused in the sample B by relatively moving the pressing body 10 while pressing the pressing body 10 against the sample B, and, as a result, the wear amount and the wear mode thereof are ascertained.

Specifications of each of the pressing body 10, the pressing mechanism 11, and relative movement mechanism 12 vary in the known wear testing methods described above.

In the present technology, when testing, apparent compressive stress Pe caused by the pressure applied to the sample B is varied, and the relationship between the apparent compressive stress Pe and the surface roughness R of the sample B obtained from the testing is acquired.

Figure 9:
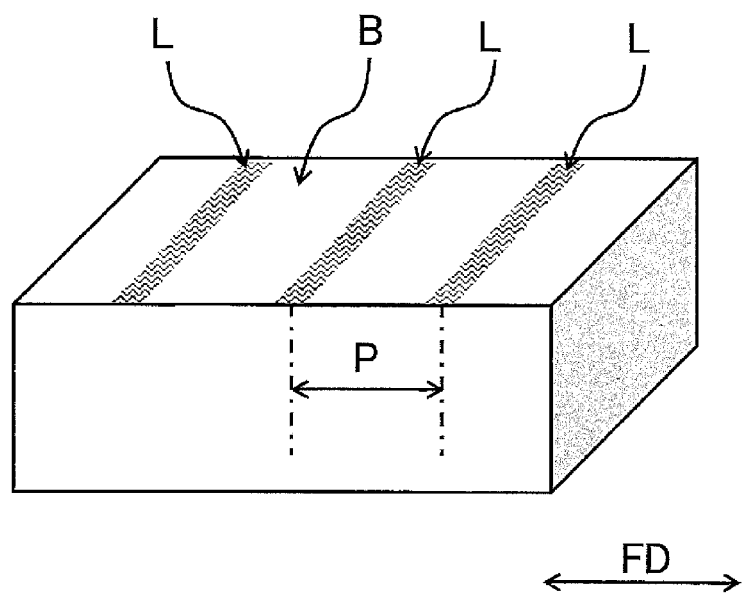
FIG. 9 is an explanatory diagram illustrating streaks of wear formed on a surface of a sample.

As illustrated in FIG. 9, streaks L of wear are formed at a spacing in a friction direction FD on the surface of the sample B as a result of the testing.

Figure 10:
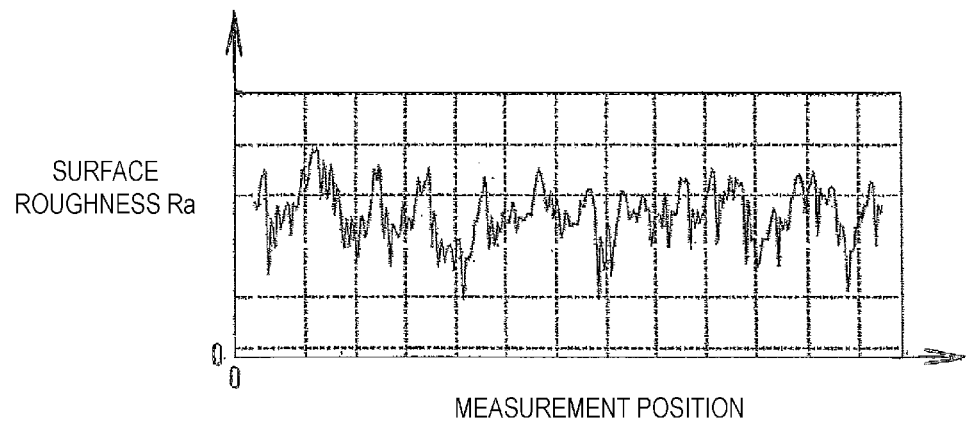
FIG. 10 is a graph illustrating a surface roughness of a sample.

The surface roughness R of the sample B is as illustrated in FIG. 10.

The arithmetic mean roughness Ra stipulated in the Japanese Industrial Standards (JIS) is used as the surface roughness R in FIG. 10.

In addition to the arithmetic mean roughness Ra, a maximum height (Ry), a ten-point average roughness (Rz), or the like can be used as the surface roughness R.

The apparent compressive stress Pe generated in the sample B is different for each of the known wear resistance tests. As such, if a plurality of differing known wear resistance tests are performed, wear resistance testing will be performed in which the apparent compressive stress Pe is varied.

For example, in DIN abrasion tests, Pico wear tests, and Lambourn abrasion tests, the apparent compressive stress Pe is 0.05 N/mm$^2$, 138.5 N/mm$^2$, and 0.333 N/mm$^2$, respectively.

It is preferable that at least a DIN abrasion test or a Pico wear test is used for the wear resistance testing.

Figure 11:
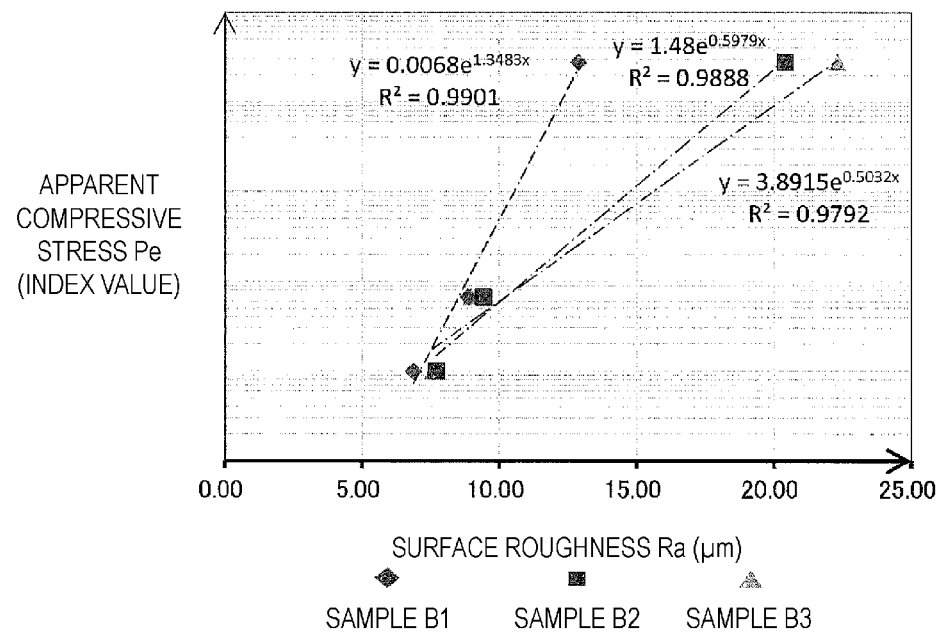
FIG. 11 is a graph illustrating a relationship between apparent compressive stress generated in the sample and the surface roughness.

As illustrated in FIG. 11, there is high correlation in the relationship between the acquired apparent compressive stress Pe and the surface roughness R.

FIG. 11 is a semilogarithmic graph on which data obtained by performing three different types of wear resistance testing on each of three types of samples B1, B2, and B3 of differing rubber types is plotted.

In FIG. 11, the apparent compressive stress Pe is shown as an index on the vertical axis, and higher index values indicate greater apparent compressive stress Pe.

As illustrated in FIG. 11, the surface roughness R (surface roughness Ra in FIG. 11) increases as the apparent compressive stress Pe increases.

Furthermore, the relationship between the surface roughness R and the wear amount K1 per unit friction energy of the sample B obtained from the testing is acquired as a result of the known wear resistance testing.

This wear amount K1 is calculated as follows:

actual wear amount $Vr$ of sample $B$/(contact area of sample $B$ with pressing body 10×tensile strength $TB$ of rubber of sample $B$×friction distance).

Figure 12:
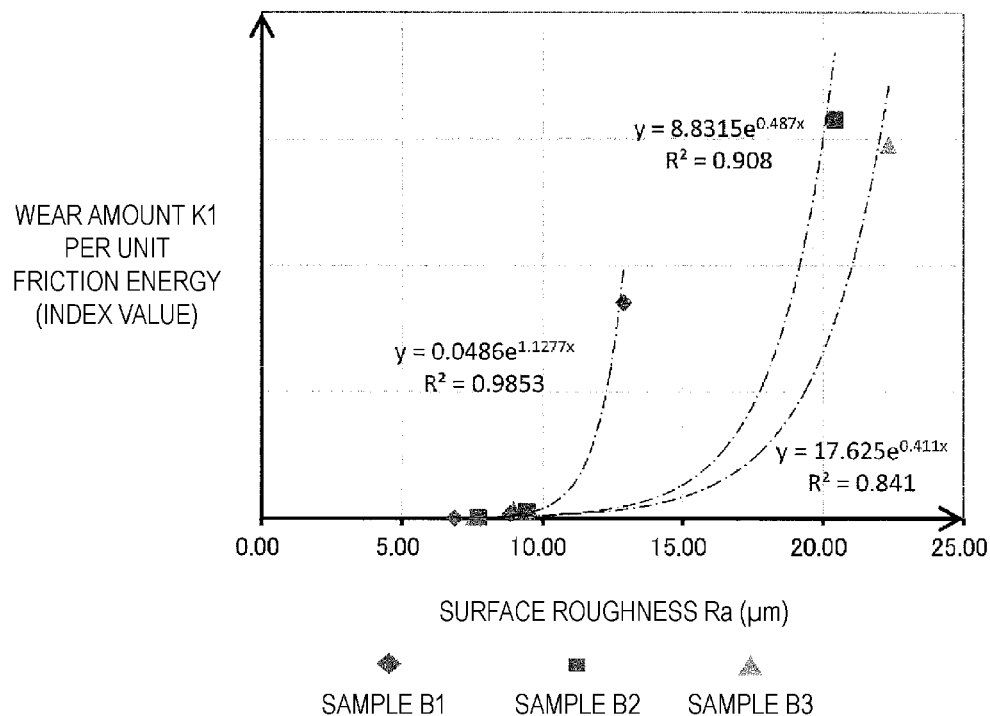
FIG. 12 is a graph illustrating a relationship between the surface roughness of the sample and a wear amount per unit friction energy.

As illustrated in FIG. 12, there is high correlation in the relationship between the acquired surface roughness R and the wear amount K1.

In FIG. 12, the wear amount K1 is shown as an index on the vertical axis, and higher index values indicate greater wear amounts K1.

That is, the wear amount K1 increases as the surface roughness R increases.

In FIG. 12, the wear amount K1 is used, but a unit contact area wear amount K2 may be used instead of the wear amount K1.

This unit contact area wear amount K2 is calculated as follows:

actual wear amount Vr of sample B/(contact area of sample B with pressing body 10).

As with the relationship between the acquired surface roughness R and the wear amount K1, there is high correlation in the relationship between the acquired surface roughness R and the wear amount K2.

A relationship between the apparent compressive stress Pe and the wear amount K1 can be acquired on the basis of the relationships illustrated in FIGS. 11 and 12 that are acquired from the testing.

Figure 13:
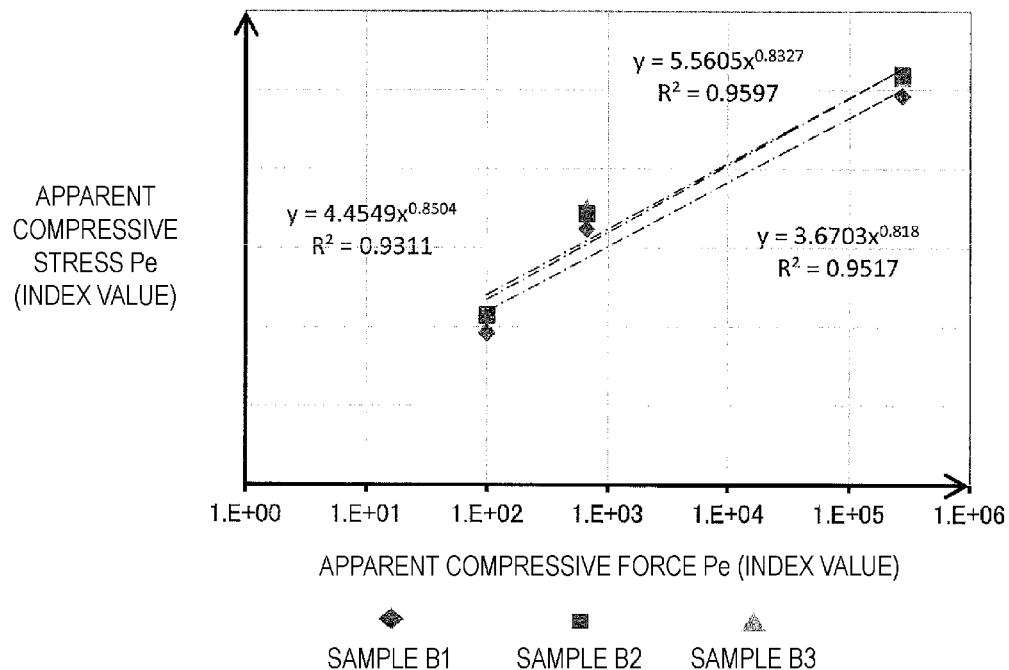
FIG. 13 is a graph illustrating a relationship between the apparent compressive stress generated in the sample and the wear amount per unit friction energy.

As illustrated in the semilogarithmic graph of FIG. 13, there is high correlation in the relationship between the apparent compressive stress Pe and the wear amount K1.

That is, the wear amount K1 increases as the apparent compressive stress Pe increases.

Using the acquired relationships illustrated in FIGS. 11, 12, and 13, a database DB2 showing the correlation between the surface roughness R, an apparent compressive stress Pr, and the wear amount K1 per unit friction energy is created.

When selecting the upper cover rubber 3 of a conveyor belt 1 with certain use conditions, the apparent compressive stress Pr generated in the upper cover rubber 3 at the use site is acquired and input into the computation device 8.

As the use conditions of the conveyor belt 1 are known, the apparent compressive stress Pr can be calculated and acquired from known conditions.

Next, in the data illustrated in FIG. 13, by using data of the same type of rubber as the upper cover rubber 3 and substituting the value of the apparent compressive stress Pr generated in the upper cover rubber 3 for the apparent compressive stress Pe, the wear amount K1 per unit friction energy of this upper cover rubber 3 is calculated.

The rubber type, for which this calculated wear amount K1 is in the preset permissible range, is selected as the upper cover rubber 3.

Here, the wear amount K1 per unit friction energy is calculated as follows:

actual wear amount $Vr$ of sample $B$/(contact area of sample $B$ with pressing body 10×tensile strength $TB$ of rubber of sample $B$×friction distance).

Thus, an actual wear amount X of the upper cover rubber 3 at the use site can be calculated on the basis of the calculated wear amount K1 and a contact area Ar of the objects to be conveyed S with the upper cover rubber 3 at the use site.

A permissible range of the actual wear amount of the upper cover rubber 3 can be preset, and the rubber type, for which the calculated wear amount X is in this permissible range, can be selected as the upper cover rubber 3.

An appropriate specification of the upper cover rubber 3 matching the actual use conditions can be determined using another database DB3 that has been input into and stored in the computation device 8.

To create this database DB3, known wear resistance testing is performed using samples B, and data is acquired.

Specifically, known wear resistance testing is performed using samples B of a plurality of rubber types that have different viscoelastic characteristics RRF.

Then, a relationship between an average wear pitch P calculated from the surface roughness R of the sample B obtained from the testing and the viscoelastic characteristics RRF of the rubber type of that sample B is acquired.

The average wear pitch P is the spacing between the streaks L of wear that are adjacent in the friction direction FD as illustrated in FIG. 9.

Figure 14:
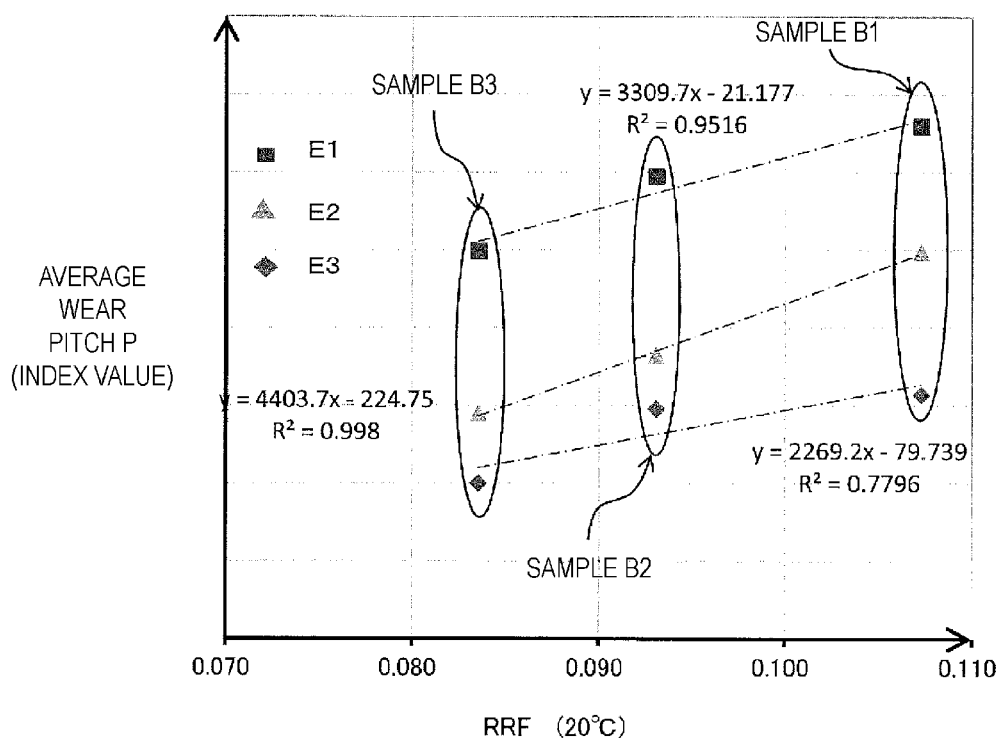
FIG. 14 is a graph illustrating a relationship between an average wear pitch and viscoelastic characteristics of the sample.

As illustrated in FIG. 14, there is high correlation in the relationship between the average wear pitch P and the viscoelastic characteristics RRF.

Data plotted in FIG. 14 is obtained by performing three different types of wear resistance tests E1, E2, and E3 on each of three types of samples B1, B2, and B3 of differing rubber types.

In FIG. 14, the average wear pitch P is shown as an index on the vertical axis, and higher index values indicate greater average wear pitches P.

Additionally, RRF at 20° C. is used as the viscoelastic characteristics RRF on the horizontal axis in FIG. 14.

RRF is an acronym for "Rolling Resistance Factor" and is an indicator of the dynamic visco-elasticity of rubber. Smaller values of the RRF indicate faster repulsion speed of the rubber, and also indicate excellent performance whereby response delays can be shortened.

As illustrated in FIG. 14, the average wear pitch P varies depending on the rubber type, and the average wear pitch P increases as the viscoelastic characteristics RRF of the rubber increases.

Furthermore, the relationship between the average wear pitch P and the actual wear amount Vr of the sample B obtained from the testing is acquired as a result of the known wear resistance testing.

Figure 15:
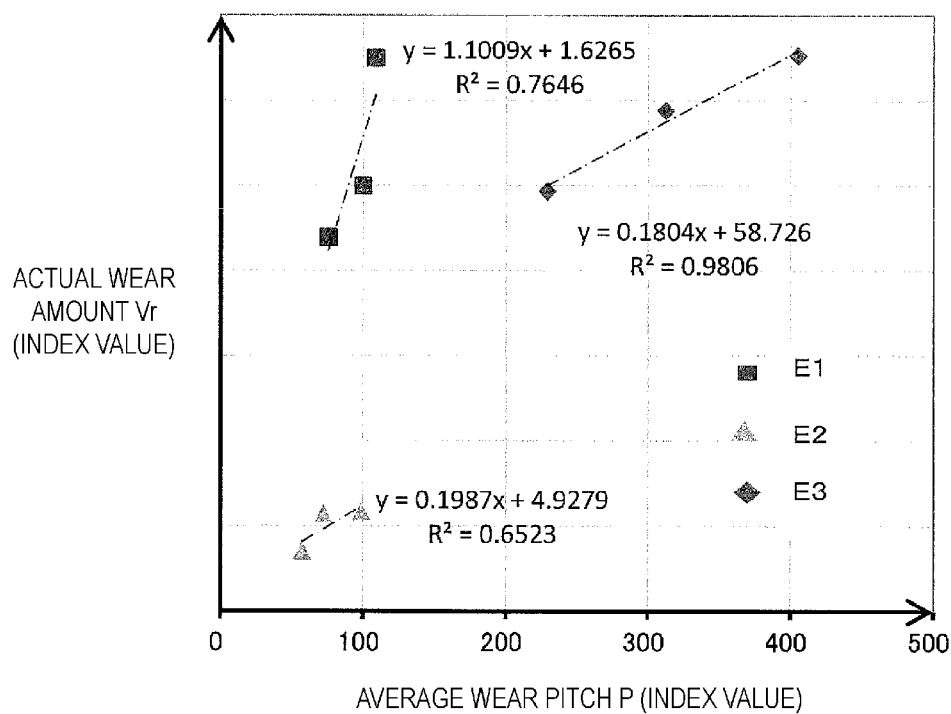
FIG. 15 is a graph illustrating a relationship between an actual wear amount and the average wear pitch of the sample.

As illustrated in FIG. 15, there is high correlation in the relationship between the average wear pitch P and the actual wear amount Vr. That is, the actual wear amount Vr of the sample B increases as the average wear pitch P increases.

In FIG. 15, the actual wear amount Vr is shown as an index on the vertical axis, and higher index values indicate greater actual wear amounts Vr.

A relationship between the viscoelastic characteristics RRF and the actual wear amount Vr can be acquired on the basis of the relationships acquired from the testing that are illustrated in FIGS. 14 and 15.

Then, using the acquired relationships illustrated in FIGS. 14 and 15, a database DB3 showing the correlation between the average wear pitch P of the sample B, the viscoelastic characteristics RRP, and the actual wear amount Vr is created.

When selecting the upper cover rubber 3 of a conveyor belt 1 with certain use conditions, the rubber type (viscoelastic characteristics RRF) of the upper cover rubber 3 intended for use is input into the computation device 8. Then, the average wear pitch P in the wear resistance testing is calculated using the data of the same type of rubber (the same viscoelastic characteristics RRF) in the data illustrated in FIG. 14 as the upper cover rubber 3 intended for use.

Next, the actual wear amount Vr of the sample B is calculated by substituting the value of the calculated average wear pitch P using the data of the same type of rubber (the same viscoelastic characteristics RRF) as the upper cover rubber 3 intended for use in the data illustrated in FIG. 15.

Then, the rubber type, for which the actual wear amount Vr of the sample B is in the preset permissible range, is selected as the upper cover rubber 3.

For example, the most appropriate rubber type is selected as the upper cover rubber 3 from among a rubber type selected using the database DB1, a rubber type selected using the database DB2, and a rubber type selected using the database DB3.

Selection criteria is configured as desired. Examples of selection criteria include selecting the rubber type commonly selected using three databases DB1, DB2, and DB3; selecting the rubber type commonly selected using databases DB1 and DB2; selecting the rubber type commonly selected using databases DB1 and DB3; and the like.

The invention claimed is:

1. A conveyor belt specification determination method, comprising:
    categorizing, into a plurality of categories, a severity of use conditions of a conveyor belt, using a horizontal energy and a vertical energy as indices, the horizontal energy and vertical energy being received by the conveyor belt as a result of objects to be conveyed being fed onto and loaded on an upper cover rubber of the conveyor belt and conveyed;
    creating a database in which a permissible range of each of prescribed characteristics is set for each of the categories, the prescribed characteristics including at least wear resistance and cut resistance of the upper cover rubber;
    setting a representative rubber physical property of the upper cover rubber that affects each of the prescribed characteristics;
    ascertaining a degree of influence of the representative rubber physical property that is set on the prescribed characteristics;
    when determining a specification of the conveyor belt, identifying the category of severity from the use conditions of the conveyor belt on a basis of the database;
    identifying an appropriate range of the representative rubber physical property for which the prescribed characteristics are in the permissible range in the category that is identified; and
    selecting a rubber type, for which the representative rubber physical property is in the appropriate range that is identified, as the upper cover rubber.

2. The conveyor belt specification determination method according to claim 1, wherein the severity of the use conditions of the conveyor belt is categorized into at least five categories.

3. The conveyor belt specification determination method according to claim 1, wherein a loss factor and a rubber hardness are included in the representative rubber physical property.

4. The conveyor belt specification determination method according to claim 1, wherein:
    an ambient temperature of a location where the conveyor belt is used is included in the use conditions and a plurality of ambient temperatures differing from each other is set; and
    the database is created for each of the ambient temperatures.

5. The conveyor belt specification determination method according to claim 4, wherein at least three ambient temperatures including a predetermined temperature of −20° C. or lower, a predetermined temperature of 80° C. or higher, and a predetermined temperature from 0° C. to 40° C. are used as the ambient temperatures.

6. The conveyor belt specification determination method according to claim 1, comprising:
    using a sample for each type of rubber, performing rubber wear resistance testing in which apparent compressive stress caused by pressure applied to the sample is varied;
    acquiring a relationship between the apparent compressive stress and a surface roughness of the sample obtained from the testing;
    acquiring a relationship between the surface roughness and a wear amount per unit friction energy of the sample obtained from the testing;
    creating a database on a basis of the acquired relationships, the database showing a correlation between the surface roughness, the apparent compressive stress, and the wear amount per unit friction energy; and
    when determining a specification of the conveyor belt, selecting a rubber type, for which the wear amount per unit friction energy of the sample is in a preset permissible range, as the upper cover rubber, on a basis of the apparent compressive stress caused by the pressure applied to the upper cover rubber by conveyed articles and the database showing the correlation.

7. The conveyor belt specification determination method according to claim 1, comprising:
    using samples of a plurality of rubber types having different viscoelastic characteristics, performing rubber wear resistance testing corresponding to the use conditions of each of the categories;
    acquiring a relationship between an average wear pitch calculated from a surface roughness of each of the samples obtained from the testing and the viscoelastic characteristics of the sample;
    acquiring a relationship between the average wear pitch and an actual wear amount of the sample obtained from the testing;
    creating a database on a basis of the acquired relationships, the database showing a correlation between the average wear pitch, the viscoelastic characteristics, and the actual wear amount of the sample; and
    when determining a specification of the conveyor belt, selecting a rubber type, for which the actual wear amount of the sample is in a preset permissible range, as the upper cover rubber, on a basis of the viscoelastic characteristics of the rubber type and the database showing the correlation.

8. The conveyor belt specification determination method according to claim 2, wherein a loss factor and a rubber hardness are included in the representative rubber physical property.

9. The conveyor belt specification determination method according to claim 8, wherein:
    an ambient temperature of a location where the conveyor belt is used is included in the use conditions and a plurality of ambient temperatures differing from each other is set; and
    the database is created for each of the ambient temperatures.

10. The conveyor belt specification determination method according to claim 4, wherein at least three ambient temperatures including a predetermined temperature of −20° C. or lower, a predetermined temperature of 80° C. or higher, and a predetermined temperature from 0° C. to 40° C. are used as the ambient temperatures.

11. The conveyor belt specification determination method according to claim 10, comprising:
  using a sample for each type of rubber, performing rubber wear resistance testing in which apparent compressive stress caused by pressure applied to the sample is varied;
  acquiring a relationship between the apparent compressive stress and a surface roughness of the sample obtained from the testing;
  acquiring a relationship between the surface roughness and a wear amount per unit friction energy of the sample obtained from the testing;
  creating a database on a basis of the acquired relationships, the database showing a correlation between the surface roughness, the apparent compressive stress, and the wear amount per unit friction energy; and
  when determining a specification of the conveyor belt, selecting a rubber type, for which the wear amount per unit friction energy of the sample is in a preset permissible range, as the upper cover rubber, on a basis of the apparent compressive stress caused by the pressure applied to the upper cover rubber by conveyed articles and the database showing the correlation.

12. The conveyor belt specification determination method according to claim 10, comprising:
  using samples of a plurality of rubber types having different viscoelastic characteristics, performing rubber wear resistance testing corresponding to the use conditions of each of the categories;
  acquiring a relationship between an average wear pitch calculated from a surface roughness of each of the samples obtained from the testing and the viscoelastic characteristics of the sample;
  acquiring a relationship between the average wear pitch and an actual wear amount of the sample obtained from the testing;
  creating a database on a basis of the acquired relationships, the database showing a correlation between the average wear pitch, the viscoelastic characteristics, and the actual wear amount of the sample; and
  when determining a specification of the conveyor belt, selecting a rubber type, for which the actual wear amount of the sample is in a preset permissible range, as the upper cover rubber, on a basis of the viscoelastic characteristics of the rubber type and the database showing the correlation.

* * * * *